United States Patent [19]

Dessauer et al.

[11] Patent Number: 5,294,254
[45] Date of Patent: Mar. 15, 1994

[54] AQUEOUS FINE DISPERSION OF AN ORGANOPHILIC SHEET SILICATE

[75] Inventors: Guido Dessauer, Tutzing; Klaus Küber, Nürnberg; Ute Horn, Dornburg, all of Fed. Rep. of Germany

[73] Assignee: Hoechst Aktiengesellschaft, Frankfurt am Main, Fed. Rep. of Germany

[21] Appl. No.: 975,089

[22] Filed: Nov. 12, 1992

[30] Foreign Application Priority Data

Nov. 12, 1991 [DE] Fed. Rep. of Germany ....... 4137091

[51] Int. Cl.$^5$ .......................... C04B 14/04; C08K 5/00
[52] U.S. Cl. .................................. 106/487; 106/287.3; 106/486; 106/499; 252/315.2; 252/315.5; 428/403; 162/135

[58] Field of Search ............... 106/287.3, 481, 486, 106/487, 499; 252/315.1, 315.2, 315.5; 427/215, 220, 384, 395, 411, 443.2; 428/403, 688; 162/135

[56] References Cited

U.S. PATENT DOCUMENTS

| | | | |
|---|---|---|---|
| 4,412,018 | 10/1983 | Finlayson et al. | 106/287.3 |
| 4,517,112 | 5/1985 | Mardis et al. | 252/315.2 |
| 4,963,192 | 10/1990 | Dessauer | 106/487 |

*Primary Examiner*—Mark L. Bell
*Assistant Examiner*—Michael Marcheschi
*Attorney, Agent, or Firm*—Connolly and Hutz

[57] ABSTRACT

The invention relates to an aqueous fine dispersion of an organophilic sheet silicate which is composed of a sheet silicate which is capable of cation exchange and of a quaternary organic onium salt reacted therewith, and contains 3 to 30% by weight, based on the organophilic sheet silicate, of polyvinyl alcohol. This fine dispersion is suitable as coating composition for paper and board and as lubricant additive for conventional coating compositions.

13 Claims, No Drawings

AQUEOUS FINE DISPERSION OF AN ORGANOPHILIC SHEET SILICATE

DESCRIPTION

EP-A 0 279 313 describes a process in which an aqueous colloidal system is prepared starting from at least one pigment and at least one water-soluble or water-swellable hydrogel containing anionic groups, and this aqueous system is subjected to coacervation by means of a quaternary organic ammonium salt. It is said that, with the aid of this process, dispersed pigments are coated by coacervation with a complex which reacts with the printing ink, so that the pigments can be applied better in water. The disadvantage of this process is the obligatory use of pigments, which leads to a high coating weight. The German Patent Application No. P 40 38 886.7, which has not yet been published, with the title "Water-containing organophilic sheet silicates" describes fine dispersions of organophilic sheet silicates in toluene. The disadvantage of these fine dispersions is the obligatory use of organic solvents such as toluene. There are increasing difficulties with the use of organic solvents, especially with regard to disposal.

An object of the invention is thus to indicate an aqueous fine dispersion of an organophilic sheet silicate, which dispersion can be used without the addition of pigments and organic solvents for the said purposes.

An object of the invention is furthermore to provide a process with which these fine dispersions of organophilic sheet silicates in aqueous medium can be prepared.

The invention relates to an aqueous fine dispersion of an organophilic sheet silicate, composed of a sheet silicate which is capable of cation exchange and of a quaternary organic onium salt reacted therewith, which dispersion contains 3 to 30% by weight, based on the organophilic sheet silicate, of polyvinyl alcohol.

The invention likewise relates to a process for the preparation of a fine dispersion of an organophilic sheet silicate in aqueous medium, starting from a water-containing precipitate of sheet silicate which is capable of cation exchange and of quaternary organic onium salt, which comprises stirring the precipitate into a clear aqueous solution of a polyvinyl alcohol at a temperature of at least 50° C., or stirring the precipitate and the polyvinyl alcohol simultaneously into the aqueous medium at a temperature of at least 50° C.

These organophilic sheet silicates are obtained by methods known per se, and are also described in the article by Prof. Dr. A. Weiss, Angew. Chem. Volume 75, No. 2, 113–148 (1963) with the title "Organic derivatives of mica-like sheet silicates" and in the N. L. Rheology Handbook of National Lead Inc. Industries, New York 1983 with the title "Guidelines for the use of rheological additives" (German translation published by N. L. Kronos Titan GmbH, Leverkusen).

Suitable sheet silicates which are capable of cation exchange are all synthetic or natural sheet silicates which can contain up to 12 to 20% by weight of impurities in the form of other minerals such as feldspar. Examples of sheet silicates of this type are montmorillonite, hectorite, saporite, sauconite, beidellite, nontronite and, preferably, bentonite.

Particularly suitable quaternary organic onium salts are compounds of the formula

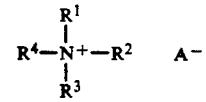

where $R^1$ and $R^2$ are $C_8$–$C_{22}$-alkyl, $C_8$–$C_{22}$-alkenyl or benzyl and $R^3$ and $R^4$ are $C_1$–$C_4$-alkyl and $A^-$ is an anion, preferably chloride. Particularly preferred compounds are dimethyldistearylammonium chloride and benzyldimethylstearylammonium chloride. When the exchangeable cations of the sheet silicate are replaced by the quaternary organic onium ion, water is removed. This is carried out by conventional processes of separation technology, for example by filtration or pressing off. The precipitate resulting after removal of water comprises about 70 to 80% by weight of water. The term precipitate means organophilic sheet silicate after the removal of the water. The precipitate can be used in the process according to the invention directly for the preparation of the fine dispersion.

Besides the precipitate, polyvinyl alcohols are also used for the preparation of the fine dispersion according to the invention. The polyvinyl alcohols used advantageously have an average molecular weight between 40 000 and 250 000. Commercial products such as ®Mowiol 10/98, ®Mowiol 28/99 and ®Mowiol 56/98 (Hoechst AG) are particularly suitable. Completely hydrolyzed or else partially hydrolyzed polyvinyl alcohols are used. Completely hydrolyzed compounds are preferably employed for use in coating compositions.

In the process according to the invention, the polyvinyl alcohol is introduced, with stirring, into an aqueous medium which is heated where appropriate, and the mixture is stirred at a temperature in the range above, preferably, 50° C. and the boiling point of the mixture until the polyvinyl alcohol is completely dissolved and a clear solution is produced. The temperature of the aqueous medium which is heated where appropriate is between approximately 20° C. and the boiling point of the aqueous medium. The polyvinyl alcohol is preferably introduced into an aqueous medium with a temperature in the range between 90° C. and 98° C., with stirring, and the mixture is stirred at a temperature between 90° C. and 98° C. until the polyvinyl alcohol is completely dissolved and a clear solution is produced. Other suitable components of the aqueous medium are water-miscible liquids. The aqueous medium is preferably composed of water without the addition of water-miscible liquids. The precipitate is introduced, likewise with stirring, into the clear solution, it being necessary to take care that the temperature of the dispersion is in the abovementioned temperature range. It is particularly advantageous if the stirring takes place with high shear forces. The addition of the precipitate to the polyvinyl alcohol solution takes place by methods known per se. The shearing process is continued until the required fine dispersity is reached (Process A).

It is likewise possible to introduce polyvinyl alcohol and precipitate simultaneously into an aqueous medium which is heated where appropriate, with stirring, preferably with high shear forces, and to stir until the required fine dispersity is reached (Process B). The simultaneous introduction of polyvinyl alcohol and precipitate into the aqueous medium which is heated where appropriate takes place by known methods, in the simplest case by simple addition.

Irrespective of the mode of addition of the precipitate, the dispersion of the precipitate takes place at a temperature between 50° C. and the boiling point of the dispersion, preferably between 90° and 98° C. The precipitate is dispersed by methods known per se.

Depending on the grain size of the particles present, it is appropriate to carry out the dispersion of the precipitate in the solution initially with a normal paddle stirrer and subsequently to carry out the fine dispersion. The fine dispersion of the precipitate takes place with suitable devices such as a Caddy mill stirrer, a colloid mill or an Ultraturrax (manufacturer: Jahnke and Kunkel). The organophilic sheet silicates are present in the fine dispersions according to the invention in an average grain size below 20 μm, preferably between 10 and 3 μm.

Maintenance of the required temperature range between 90° and 98° C. and stirring with high shear forces lead to the best results concerning the fine dispersity and the use as coating agent for paper and board.

The fine dispersions according to the invention as a rule have a content of organophilic sheet silicates in the range from 3 to 20% by weight, preferably between 3 and 17, particularly preferably between 3 and 10%, by weight, based on the total weight of the fine dispersion. The content of polyvinyl alcohol in the aqueous fine dispersion is between 3 and 30% by weight, preferably between 12 and 17% by weight, based on the organophilic sheet silicate.

The fine dispersions according to the invention can be used directly for coating paper and board, it being advisable to preserve the prepared fine dispersions by known measures. Preservation is possible by the addition of suitable disinfectants such as hydrogen peroxide or quaternary ammonium salts with bactericidal properties. It is possible to add optical brighteners which are known to the person skilled in the art to the fine dispersions according to the invention before the coating, in order to suppress the yellow tints appearing in aqueous coatings.

The fine dispersions according to the invention also have a high stability and storability and are suitable for the preparation of coating compositions for paper and board, which likewise have good stability and storability.

The fine dispersions according to the invention are suitable for coating paper and board both on one side and on both sides. They are suitable for coating all types of papers which are required for intaglio printing, rotary offset printing, sheet-fed offset printing and letterpress printing. They are particularly suitable for coating low weight paper such as LWC or LLWC papers. The coating takes place with the aid of suitable devices such as airbrush coating machines, gravure coaters, blade coaters or size presses, with known processes being employed.

For economic reasons, it is endeavoured to use thin printing papers for large edition printed products, for example for periodicals or mail order catalogs. However, in this case problems arise concerning the opacity, i.e. on printing there is interference by the printing showing through on the other side of the paper. This effect is prevented by applying the aqueous fine dispersions prepared by the process according to the invention to the paper. Depending on the choice of the application system and the chosen type of paper, the aqueous fine dispersion is diluted to lower solids contents. Thus, it has emerged that it is advantageous when using size presses and a speed sizer (Voith Heidenheim system) or metering size press system to adjust the fine dispersion to a solids content in the range between 7 and 9% by weight, based on the total weight of the fine dispersion. It has emerged that the fine dispersions can also be used as additive for pigmented coating compositions of a conventional type in the order of magnitude of 0.3 to 3% by weight, based on the total dry content, in which case they are employed to replace the calcium stearate used as lubricant.

Besides dilution of the fine dispersions, it is also possible for the fine dispersions to be concentrated by suitable measures, such as vacuum distillation, and to be used in this concentrated form for coating paper and board. The fine dispersions according to the invention prepared by concentration preferably have a content of organophilic sheet silicates in the range from 20 to 50% by weight, based on the total weight. It has emerged that these concentrated fine dispersions can also be used as additive to pigmented coating compositions of a conventional type in the order of magnitude of 0.3 to 5% by weight, based on the total dry content, in which case they are employed to replace the calcium stearate used as lubricant.

The papers and boards coated with the fine dispersions according to the invention are then glazed in a subsequent step, the glazing preferably being effected with cooled rolls.

The advantages of the process according to the invention comprise the possibility of dispensing with the use, hitherto customary, of pigments for the preparation of the aqueous fine dispersions, and it is thus made possible to keep the coating weight of the aqueous fine dispersions very low. The coating weight with the fine dispersions according to the invention is preferably in a range from 1.0 to 1.6 g/m$^2$ on each side. The advantages which are achieved with the fine dispersions according to the invention on printed articles may be described as follows: completely impervious to toluene, reduction in the striking through and showing through of the printing ink, increase in the crispness of color and depth of color, improvement in the ink reception, increase in printing gloss and reduction in missing dots. In the case of board, which is often lacquered after printing, the use of lacquer is reduced by the coating with the composition according to the invention.

Because of their oleophilic surface properties, the fine dispersions according to the invention can preferably be employed in intaglio printing and rotary offset printing.

General method for the preparation of the fine dispersion

Process A

The polyvinyl alcohol is sprinkled into the calculated amount of aqueous medium while stirring with a paddle stirrer. The mixture is then heated to 95° C. and stirred until the solution is clear and without specks. The precipitate is added in portions to this clear solution while stirring. The mixture is subsequently homogenized at high shear with an Ultraturrax (manufacturer: Jahnke and Kunkel) until a colloidal fine dispersion is obtained. The fine dispersity is determined with a Malvern 2600 C (manufacturer: Malvern, England; type: laser light diffraction apparatus).

Process B

Polyvinyl alcohol and precipitate are introduced together into the initially introduced aqueous medium while stirring. The dispersion is then sheared as described in Process A until a colloidal dispersion is obtained. The fine dispersity is determined as in Process A.

| Example | 1 | 2 | 3 | 4 | 5 |
|---|---|---|---|---|---|
| Process | A | B | A | B | A |
| | Amounts in g | | | | |
| Precipitate*) | 528.0 | 490.0 | 453.0 | 415.0 | 377.0 |
| ®Mowiol 28/99 | 14.0 | | 17.0 | | 18.0 |
| ®Mowiol 56/98 | | 15.5 | | 17.5 | |
| $H_2O_2$ (10% by weight) | 2.0 | 2.0 | 2.0 | 2.0 | 2.0 |
| Water | 456.0 | 492.5 | 528.0 | 528.0 | 603.0 |
| Average grain size**) in μm | 19 | 18 | 16 | 14 | 11.3 |

*)Solids content 26% by weight
**)the average grain size is related to the $D_{50}$ value of the volume distribution and is determined with the ®Malvern 2600 C (manufacturer: Malvern, England; type: laser light diffraction apparatus).

Coating and test printing

The fine dispersions of Examples 1 to 5 are used to coat an SC paper (about 10% by weight of pulp, about 21% by weight of filler). The coating takes place with the aid of a gravure coater (multicoater with contra-rotating engraved roll, uptake of coating composition: 33.2 ml/m²). The substrate paper is coated on both sides. The coater is followed immediately by drying of the coated paper. The paper is glazed before a test printing.

The following results of test printing are obtained with the coating compositions:

| Example | 1 | 2 | 3 | 4 | 5 |
|---|---|---|---|---|---|
| Coatings weight in g/m² and side | 1.6 | 1.6 | 1.6 | 1.6 | 1.6 |
| Pick resistance | good | good | good | good | very good |
| Opacity | good | good | good | good | very good |
| Holdout | good | good | good | good | very good |
| Color crispness | good | good | good | good | very good |

Example 5, in particular, shows that even with a low precipitate content of the fine dispersion the resulting values relating to the improved printability, especially relating to the absolute imperviousness to toluene, are outstanding.

We claim:

1. An aqueous fine dispersion of an organophilic sheet silicate, consisting essentially of a sheet silicate which is capable of cation exchange and a quaternary organic onium salt reacted therewith, which dispersion contains 3 to 30% by weight, based on the organophilic sheet silicate, of polyvinyl alcohol, and said dispersion containing no pigments or organic solvents.

2. An aqueous fine dispersion as claimed in claim 1, wherein the sheet silicate which is capable of cation exchange comprises at least one of montmorillonite, hectorite, saporite, sauconite, beidellite, nontronite and bentonite.

3. An aqueous fine dispersion as claimed in claim 1 wherein the quaternary organic onium salt comprises compounds of the formula $(NR^1R^2R^3R^4)^+$ $A^-$ in which $R^1$ and $R^2$ are $C_8$–$C_{22}$-alkyl, $C_8$–$C_{22}$-alkenyl or benzyl, $R^3$ and $R^4$ are $C_1$–$C_4$-alkyl and $A^-$ is an anion.

4. An aqueous fine dispersion as claimed in claim 1, wherein the polyvinyl alcohol has an average molecular weight of 40 000 to 250 000.

5. An aqueous fine dispersion as claimed in claim 1, which contains 3 to 20% by weight, based on the total weight, of organophilic sheet silicate.

6. An aqueous fine dispersion as claimed in claim 1, wherein the average grain size of the organophilic sheet silicate is below 20 μm.

7. A process for the preparation of a fine dispersion of an organophilic sheet silicate in aqueous medium, said dispersion containing no pigments or organic solvents starting from the components consisting essentially of a water-containing precipitate of sheet silicate which is capable of cation exchange and a quaternary organic onium salt, which consisting essentially of stirring the precipitate into a clear aqueous solution of a polyvinyl alcohol at a temperature of at least 50° C., or stirring the precipitate and the polyvinyl alcohol, simultaneously into the aqueous medium at a temperature of at least 50° C.

8. Paper or board coated on one side or both sides with a coating comprising the aqueous fine dispersion as claimed in claim 1.

9. Paper or board as claimed in claim 8, wherein the coating weight is equal to or less than 2 g/m².

10. A coating composition for paper or board, consisting essentially of an aqueous fine dispersion as claimed in claim 1.

11. An aqueous fine dispersion as claimed in claim 1, wherein the sheet silicate which is capable of cation exchange comprises bentonite.

12. An aqueous fine dispersion as claimed in claim 2, wherein the quaternary organic onium salt comprises compounds of the formula $(NR^1R^2R^3R^4)^+$ $A^-$ in which $R^1$ and $R^2$ are $C_8$–$C_{22}$-alkyl, $C_8$–$C_{22}$-alkenyl or benzyl, $R^3$ and $R^4$ are $C_1$–$C_4$-alkyl and $A^-$ is an anion.

13. An aqueous fine dispersion of an organophilic sheet silicate, consisting essentially of a sheet silicate which is capable of cation exchange and a quaternary organic onium salt reacted therewith, and at least one of i) a disinfectant selected from the group consisting of hydrogen peroxide and quaternary ammonium salts, and ii) at least one optical brightener, which dispersion contains 3 to 30% by weight, based on the organophilic sheet silicate, of polyvinyl alcohol, and said dispersion containing no pigments or organic solvents.

* * * * *

UNITED STATES PATENT AND TRADEMARK OFFICE
CERTIFICATE OF CORRECTION

PATENT NO. : 5,294,254
DATED : March 15, 1994
INVENTOR(S) : Dessauer et al

It is certified that error appears in the above-indentified patent and that said Letters Patent is hereby corrected as shown below:

Column 6, line 35, claim 8, "comprising" should read —consisting essentially of—.

Column 6, line 28, "consisting essentially of" should read —comprises—.

Signed and Sealed this

Fourth Day of October, 1994

Attest:

BRUCE LEHMAN

Attesting Officer

Commissioner of Patents and Trademarks